United States Patent Office 3,462,430
Patented Aug. 19, 1969

3,462,430
2-CHLOROMETHYL-4-ALKANOLAMINO-6-
TERTIARY AMINO TRIAZINES
Werner Heimberger, Hanau am Main, Germany, assignor
to Deutsche Gold- und Silber-Scheideanstalt vormals
Roessler, Frankfurt am Main, Germany
No Drawing. Filed Mar. 18, 1966, Ser. No. 535,314
Claims priority, application Germany, Mar. 23, 1965,
D 46,866
Int. Cl. C07d 55/50, 99/04; A61k 27/00
U.S. Cl. 260—247.5
9 Claims

ABSTRACT OF THE DISCLOSURE

Novel substituted triazines of the formula

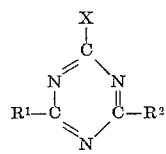

in which X represents —$CCl_3$, —$CHCl_2$ or —$CH_2Cl$, $R^1$ represents piperazino, N'-lower alkyl piperazino or morpholino, and $R^2$ represents

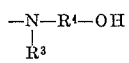

in which $R^3$ represents lower alkyl with 1–6 C atoms or preferably hydrogen and $R^4$ is a lower alkylene with 1–6 C atoms. The triazines are antiphlogistics.

---

The present invention relates to novel substituted s-triazines of the formula

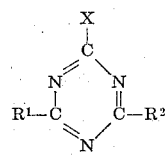

in which X represents —$CCl_3$, $CHCl_2$ or —$CH_2Cl$, $R^1$ represents piperazino, N'-alkyl piperazino (alkyl=1–4 C atom alkyl), piperidino or, preferably, morpholino, $R^2$ represents

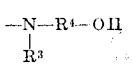

in which $R^3$ is lower alkyl with 1–6 C atoms or, preferably, hydrogen, and $R^4$ is a lower alkylene with 1–6 C atoms.

The compounds according to the invention can be produced by the following procedures:

(a) Reacting a compound of the formula

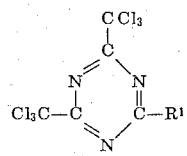

with at least a stoichiometrical amount of a compound of the formula

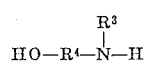

in the presence of a catalytic amount of an alkali metal alcoholate.

(b) Reacting a compound of the formula

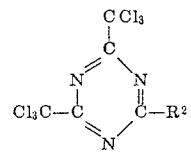

with a sufficient excess of a compound of the Formula III piperazine, N-alkyl-piperazine, piperidine or morpholine, if desired, in the presence of small quantities of an organic solvent, preferably, in the presence of catalytic quantities of water or alkali metal hydroxide at room temperature.

(c) Reacting a compound of the formula

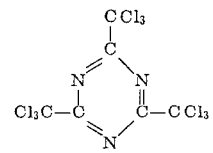

with piperazine, N-alkyl-piperazinee, piperidine or morpholine under the conditions described for procedure (b).

The compounds thus prepared can, if desired, be catalytically hydrogenated to a compound of the formula

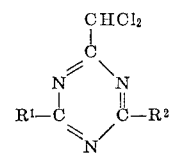

or

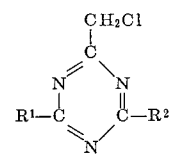

for example, in the presence of an equimolar quantity of a tertiary amine when only one of the chlorine atoms is to be replaced with hydrogen and in the presence of twice such quantity of the tertiary amine when two of the chlorine atoms are to be replaced.

With procedure (a) it is expedient to employ an excess of the amine. Preferably, about 2 mol of amine are provided per mole of triazine. The alkali metal alcoholate can be used in quantities of 0.1 to 10%. The reaction can be carried out at room temperature or moderately raised temperature without application of pressure. A lower aliphatic alcohol, such as, methanol or ethanol, can be employed advantageously as a solvent.

With procedures (b) and (c) such quantities of the amine are used that the starting triazine compound can be dissolved therein. For example, the starting triazine and the amine can be used in a ratio of about 1:5 to about 1:20. If the amine employed is a solid substance it can first be dissolved in a small quantity of an organic solvent, such as, for example, acetone, ethyl acetate, dioxane and the like.

As already indicated, the water or the alkali metal hydroxide should be used in catalytic quantities. Catalytic quantities, for example, are 0.1 to 10% of the quantity of the triazine.

The compounds according to the invention precipitate out either directly or after distilling off the excess amine as solid substances which, if desired, can be recrystallized for further purification.

The compounds according to the invention possess valuable pharmaceutical properties and are especially valuable because of their antiphlogistic action upon oral administration.

The compounds, for example, upon oral administration in doses of 20 to 300 mg./kg. exhibit a strong antiphlogistic action on ovalbumen edema of the rat paw. The compounds upon oral administration to rats act toxic in doses over 500 mg./kg. and in some instances 6500 mg./kg.

The following examples will serve to illustrate the compounds according to the invention and their preparation.

EXAMPLE 1

30 g. of 2,4-bis-trichloromethyl-6-morpholino-s-triazine were suspended in 200 ml. of methanol and 9.12 g. of ethanol amine and 0.5 g. of Na dissolved in 50 ml. of methanol added thereto. The mixture was heated under reflux until solution occurred (about 10 minutes) and such heating continued for about a further 50 minutes. The solution was cooled on ice, whereby 2-trichloromethyl-4-ethanolamino-6 - morpholino-s-triazine crystallized out in almost analytically pure form. After it was filtered off, washed with water and dried, 22 g. of the product with a melting point of 162–164° C. were obtained. The yield was 86.3% of theory.

The starting material of this example was produced by dissolving 1 mol of tris-trichloromethyl-s-triazine in about 1 liter of methanol and adding 1 mol of morpholine to such solution at 10° C. Upon addition of the amine the solution warmed up to about 40–50° C. When the reaction solution cooled down the 2,4-bis-trichloromethyl-6-morpholino-s-triazine precipitated out and was filtered off and washed. The yield was about 75% of theory. The melting point was 160–165° C.

The corresponding 6-piperidino compound of a melting point of 106–110° C. and the corresponding 6-N'-methyl piperazino compound of a melting point of 109–120 C. used in various of the following examples were produced in an analogous manner.

EXAMPLE 2

29 g. of 2,4-bis-trihcloromethyl-6-piperazino-s-triazine were dissolved in 250 ml. of methanol and 16.4 g. of 1-aminopropanol-(2) and a solution of 0.5 g. of Na in 50 ml. of methanol added thereto. The mixture was heated under reflux until solution occurred (about 30 minutes) and such heating continued for about a further 30 minutes. The solvent was then distilled off and the residue stirred up with water, whereupon crystallization occurred. After the crystals had been washed until neutral with water, and drying, 22 g. of 2-trichloromethyl-4-(2)-propanolamino-(1)-6-piperazino-s-triazine of a melting point of 128–132° C. were obtained. The yield was 82.5% of theory.

EXAMPLE 3

60 g. of 2,4-bis-trichloromethyl-6-piperidino-s-triazine were suspended in 600 ml. of ethanol and 33.9 g. of 1-amino-propanol-(3) and a solution of 0.5 g. of Na in 50 ml. of methanol added thereto. The mixture was heated under reflux until solution occurred (about 30 minutes) and such heating continued for about a further 30 minutes. After processing as in Example 2, 52 g. of 2-trichloromethyl-4-(3)-propanol - amino-(1)-6-piperidino-s-triazine of a melting point of 129–133° C. were obtained. The yield was 97.5% of theory.

EXAMPLE 4

36 g. of 2,4-bis-trichloromethyl-6-morpholino-s-triazine were suspended in 250 ml. of methanol and 20.25 g. of 1-aminopropanol-(2) and a solution of 0.5 g. of Na in 50 ml. of methanol added thereto. The mixture was heated under reflux until solution occurred (about 10 minutes) and such heating continued for about a further 50 minutes. After processing as in Example 1, 25 g. of 2-trichloromethyl-4-(2) - propanolamino - (1) - 6-morpholino-s-triazine of a melting point of 145–147° C. were obtained. The yield was 78.3% of theory.

EXAMPLE 5

29 g. of 2-trichloromethyl-4-ethanol-amino-6-morpholino-s-triazine (obtained according to Example 1) were suspended in 450 ml. of methanol and 0.5 g. of Pt-oxide (80.91% Pt) and 8.38 g. of triethyl amine (molar ratio 1:1) added thereto. When hydrogen was introduced into such suspension its temperature, without external cooling, rose from 15° C. to 27° C. within about 30 minutes and remained at such temperature until the take up of hydrogen ceased after a total of 60 minutes. After the catalyst was separated off, the solution was cleared with active carbon and boiled down. The resulting crystalline 2-dichloromethyl-4-ethanol-amino - 6 - morpholino-s-triazine was washed out with water. 25.0 g. of the product of a melting point of 145–150° C. were obtained. The yield was 96% of theory.

EXAMPLE 6

41 g. (0.112 mol) of 2-trichloromethyl-4-ethanol-amino-6-morpholino-s-triazine (obtained according to Example 1) were suspended in 500 ml. of methanol and 0.5 g. of Pt-oxide (80.91% Pt) and 24.2 g. (above 0.2 mol) of triethyl amine (molar ratio 1:2) added thereto. When hydrogen was introduced into such suspension its temperature, without external cooling, rose from 15° C. to 33° C. After about 2 hours introduction of hydrogen the triethyl amine had been used up and the take up of the hydrogen ceased. After the catalyst was separated off, the solution was cleared with active carbon and boiled down. The resulting crystalline 2-monochloromethyl-4-ethanol-amino-6-morpholino-s-triazine was washed out with water. 31.2 g. of the product of a melting point of 135–137° C. were obtained. The yield was 95% of theory.

EXAMPLE 7

300 g. (0.82 mol) of 2,4-bis-trichloromethyl-6-morpholino-s-triazine were suspended in 2 liters of methanol (mother liquor from previous operation) and a solution of 4 g. of Na in 200 ml. of methanol and 168 g. (3×0.82 mol) of 1-aminopropane-2-ol added thereto. The mixture was heated while stirring under reflux for 2 hours. Solution occurred after about 15 minutes heating. After cooling to 0° C., the resulting 2-trichloromethyl-4-(1-propane-2-ol)-amino-6-morpholino-s-triazine crystallized out. After filtering, washing and drying, the yield was 240 g. or 90% of theory. The melting point was 147–149° C.

EXAMPLE 8

388 g. (2 mol) of piperazine hexahydrate were dissolved in 1 liter of methanol and 433 g. (1 mol) of tris-trichloromethyl-s-triazine added thereto portionwise over a period of 45 minutes at 10° C. while stirring. After the addition was completed, the solution was warmed to dissolve the 2-piperazino-4,6-bis-trichloromethyl-s-triazine formed and filtered to remove the undissolved dimer which also had formed.

Yield: 300 g. (75% of theory), melting point 138–140° C.

400 g. of 2-piperazino-4,6-bis-trichloromethyl-s-triazine prepared as above were suspended in 2.5 liters of methanol and 244 g. (4 mol) of ethanolamine added thereto and the solution refluxed for 12 hours. After filtering the solution was boiled down and the viscous residue stirred up with water whereupon the 2-trichloromethyl-4-ethanol-amino-6-piperazino-s-triazine crystallized out.

Yield: 275 g. (80% of theory), melting point 139–142° C.

EXAMPLE 9

414 g. (1 mol) of 2,4-bis-trichloromethyl-6-N'-methyl-piperazino-s-triazine were suspended in 2.5 liters of methanol and 183 g. (3 mol) of ethanolamine and a solution of 0.4 g. of Na in 10 ml. of methanol added thereto. The mixture was heated under reflux for 3 hours. After filtering, the resulting solution was boiled down and the residue stirred up with water whereupon the 2-trichloromethyl-4-ethanolamino - 6 - N' - methyl-piperazino-s-triazine crystallized out.

Yield: 250 g. (70% of theory), melting point 136–140° C.

EXAMPLE 10

38.9 g. of 2-N-methylethanolamino-4,6-bis-trichloromethyl-s-triazine were dissolved in 87.12 g. of morpholine. The solution was allowed to stand at room temperature for 2 days and was then heated for 2 hours at 60° C. The excess morpholine was then distilled off and the residue dissolved in methylene chloride and washed with diluted hydrochloric acid. The methylenechloride solution was boiled down whereby the viscous 2-trichloromethyl-4-morpholino - 6 - N-methyl-ethanol-amino-s-triazine was obtained. Yield: 32 g. (89% of theory).

I claim:
1. A compound of the formula

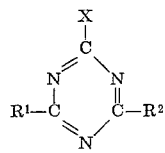

in which X is selected from the group consisting of —$CCl_3$, $CHCl_2$ and —$CH_2Cl$, $R^1$ is selected from the group consisting of piperazino, N'-alkyl-piperazino in which the alkyl is of 1–4 carbon atoms, piperidino and morpholino and $R^2$ is a hydroxyl alkyl amino of the formula

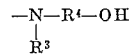

in which $R^4$ is alkylene of 1–6 carbon atoms and $R^3$ is selected from the group consisting of hydrogen and alkyl of 1–6 carbon atoms.

2. The compound of claim 1 wherein $R^2$ is

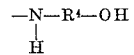

3. The compound of claim 2 wherein $R^1$ is morpholino.
4. The compound of claim 1 in which $R^1$ is morpholino and $R^2$ is ethanol amino.
5. A compound according to claim 1 consisting of 2-trichloromethyl-4-ethanolamino-6-morpholino-s-triazine.
6. A compound according to claim 1 consisting of 2-trichloromethyl-4-(2)-propanolamino - (1) - 6-morpholino-s-triazine.
7. A compound according to claim 1 consisting of 2-trichloromethyl-4-ethanolamino-6-piperazino-s-triazine.
8. A compound according to claim 1 consisting of 2-trichloromethyl-4-ethanolamino-6-N'-methyl - piperazino-s-triazine.
9. A compound according to claim 1 consisting of 2-trichloromethyl-4 - (2)-propanolamino - (1) - 6 - piperazino-s-triazine.

References Cited

UNITED STATES PATENTS 3,305,348  2/1967  Schwarze et al. _____ 71—2.5

ALEX MAZEL, Primary Examiner

J. TOVAR, Assistant Examiner

U.S. Cl. X.R.
260—249.9, 999